(12) United States Patent
Furuya

(10) Patent No.: US 6,863,411 B2
(45) Date of Patent: Mar. 8, 2005

(54) POINTER TYPE INDICATOR HAVING MEANS TO IMPROVE DIAL VISIBILITY

(75) Inventor: Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/372,313

(22) Filed: Feb. 25, 2003

(65) Prior Publication Data

US 2003/0189819 A1 Oct. 9, 2003

(30) Foreign Application Priority Data

Apr. 5, 2002 (JP) ........................................ 2002-103909

(51) Int. Cl.⁷ .............................................. G01D 11/28
(52) U.S. Cl. ........................... 362/23; 362/29; 362/271; 362/489; 362/555
(58) Field of Search .............................. 362/23, 24, 26, 362/28, 29, 31, 551, 555, 559, 560, 459, 464, 470, 471, 478, 482, 487, 488, 489, 540, 543, 545, 85, 257, 269, 271; 116/28 R, 35 R, 46, 47, 48, 49, 200, 284, 286, 287, 288, 298

(56) References Cited

U.S. PATENT DOCUMENTS

| | | | | |
|---|---|---|---|---|
| 2,831,453 A | * | 4/1958 | Hardesty ..................... | 116/288 |
| 4,252,078 A | * | 2/1981 | Fukasawa et al. .......... | 116/288 |
| 4,323,951 A | * | 4/1982 | Pasco .......................... | 362/27 |
| 5,142,453 A | * | 8/1992 | Ohta et al. ................... | 362/29 |
| 5,523,922 A | * | 6/1996 | Kato ............................ | 362/23 |
| 5,631,448 A | * | 5/1997 | Rabinowitz et al. ........ | 116/288 |
| 6,032,608 A | * | 3/2000 | Oreans et al. .............. | 116/288 |

* cited by examiner

*Primary Examiner*—John Anthony Ward
*Assistant Examiner*—Ismael Negron
(74) *Attorney, Agent, or Firm*—Armstrong, Kratz, Quintos, Hanson & Brooks, LLP

(57) ABSTRACT

A pointer type indicator having a dial plate (30) with indexes corresponding to measured values and a pointer (10) for pointing to respective indexes of the dial plate (30). The pointer (10) includes a pointing portion (103) to be illuminated by light emitted from a pointer light source (102), and light guides (103*d*, 101*d*, 101*e*, 104) for guiding a part of light emitted from the pointer light source (103) to illuminate a limited area of the dial plate (30) behind the pointing portion (103).

5 Claims, 4 Drawing Sheets

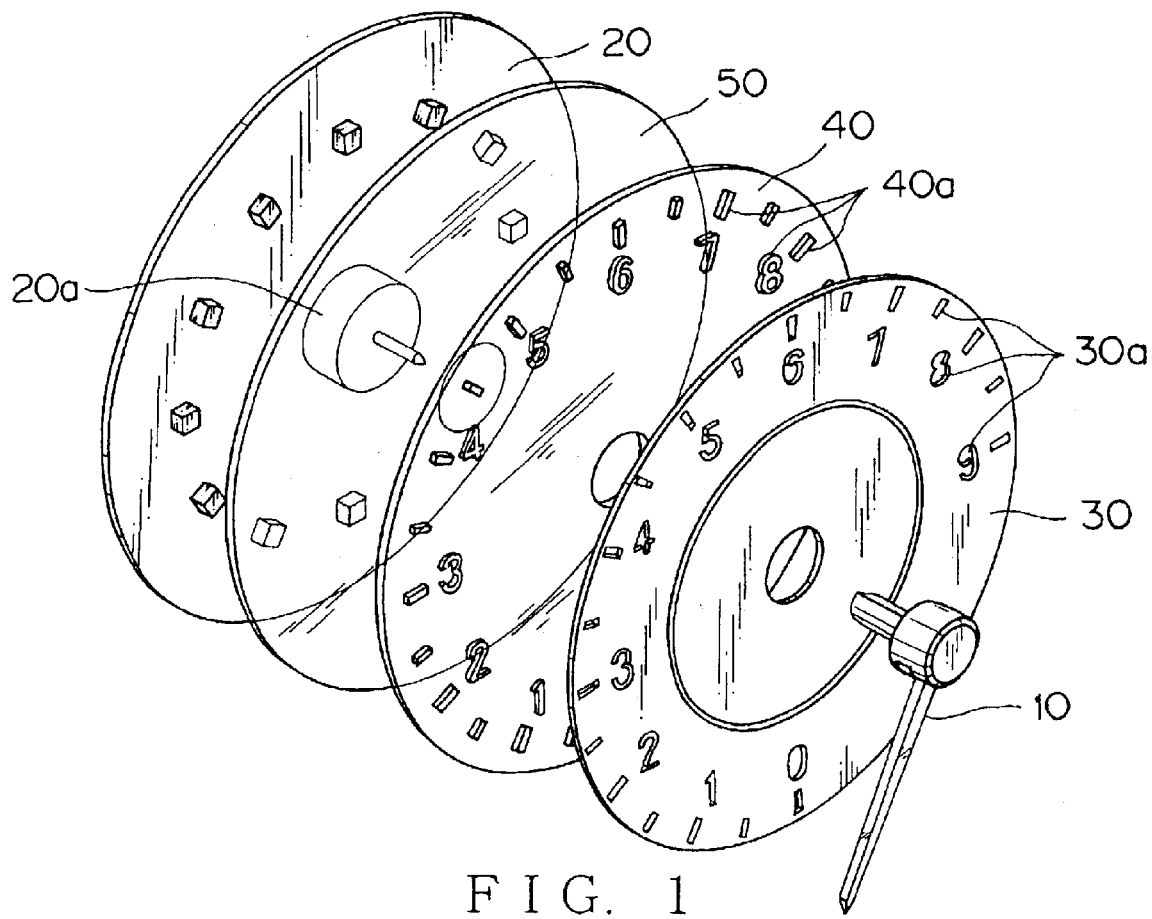
F I G. 1
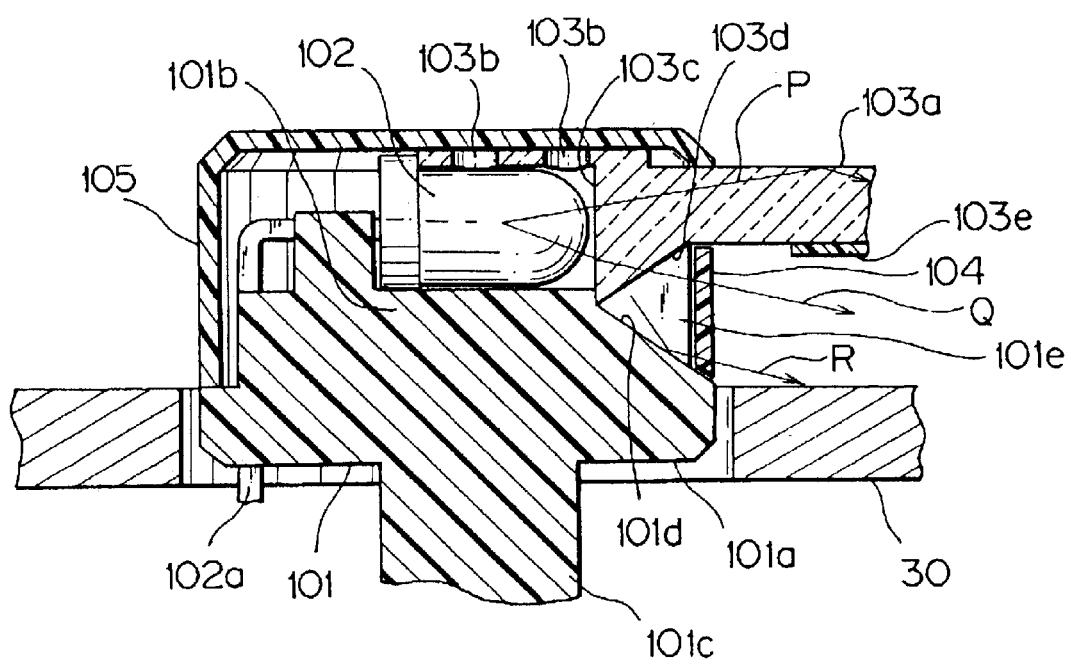
F I G. 3

POINTER TYPE INDICATOR HAVING MEANS TO IMPROVE DIAL VISIBILITY

BACKGROUND OF THE INVENTION

1. Field of the Invention

This invention relates to a pointer type indicator particularly useful for a vehicle.

2. Description of the Related Art

Generally, a vehicle has pointer type indicators pointing measured value, such as a speedometer and a tachometer. This pointer type indicator comprises a dial plate having indexes such as graduations and numbers, letters or marks thereon, a pointer arranged adjacent to the front of the dial plate, internal mechanism for driving the pointer according to the measured value, and a wiring board with a circuit pattern on which the inner mechanism is fixed.

Said dial plate is printed with, for example, a dark color at its transparent surface made of synthetic resin such as acrylic resin or polycarbonate resin except areas on which said indexes are provided. In daytime, daylight or outside light illuminates the pointer or the dial plate so that a vehicle driver can recognize the indexes visually. In night, light emitted from a light source arranged behind the dial plate penetrates through the indexes so that the driver can recognize the indexes visually.

Incidentally, there are various grades of vehicles, especially of passenger vehicles. Consequently, if a pointer type indicator with a dial plate made of synthetic resin is mounted on a high grade passenger vehicle, the indicator compares unfavorably with other loading apparatus in respect to a high class feeling, so that occupants in the vehicle may feel uncomfortable with the indicator. Therefore, in order to use for a passenger car of such a high-class grade, there are demands to use a metallic dial plate.

However, in a conventional structure, when a metal dial plate is used, especially in night, only a pointer and indexes are illuminated to see in the dark, and the metallic dial plate is hardly to be recognized visually. Consequently, it is difficult for the occupants in the vehicle to recognize a metallic feel of the dial plate.

SUMMARY OF THE INVENTION

This invention has been accomplished to solve the above-described problems and an object of this invention is to provide a pointer type indicator being capable of improve visibility of a dial plate thereof.

In order to achieve the object being described above, according to a first aspect of this invention, there is provided a pointer type indicator comprising a dial plate having indexes corresponding to measured values and a pointer for pointing respective indexes of the dial plate, whereby said pointer includes a pointing portion to be illuminated by light emitted from a pointer light source and light guide means for guiding apart of light emitted from the pointer light source to illuminate a limited area of the dial plate behind the pointing portion.

Therefore, even in night, the part of the dial plate as the background of the pointing portion is illuminated to make the dial plate pointing by the pointer visible. Moreover, since just the limited area around the pointing portion on the dial plate is illuminated, a novel and interesting visibility can be offered.

According to a second aspect of this invention, there is provided the pointer type indicator, wherein said pointing portion includes a pointer main body into which the light emitted from the pointer light source is introduced, and a light emitting layer provided on the pointer main body for emitting light of first color by the introduced light, and said light guide means include color change means for converting the light emitted from the pointer light source to a light of second color which is different from the first color.

Therefore, the pointer and the limited area of the dial plate as the background of the pointer can be visible with different colors respectively. Resultingly, a novel and interesting visibility can be offered.

According to a third aspect of this invention, there is provided the pointer type indicator, wherein said light guide means include a shield wall for limiting said limited area.

Therefore, the illuminated area of the dial plate can be limited intentionally in both longitudinal and transverse directions.

According to a fourth aspect of this invention, there is provided the pointer type indicator, wherein said light guide means include a light guiding portion provided on the pointer main body for guiding a part of light introduced into the pointer main body toward the dial plate, said color change means convert the light guided from the guiding portion to the light of the second color which is different from the first color, and said shield wall limits the area to be illuminated by the light of second color derived from the color change means.

Therefore, the light emitted from the pointer light source can be used for illuminating the pointer and the part of the dial plate. Moreover, since the color of the emitting light of the pointer is different from the illumination color of the dial plate, a novel and interesting visibility can be offered.

According to a fifth aspect of this invention, there is provided a pointer type indicator which comprises a dial plate having indexes corresponding to measured values and a pointer for pointing respective indexes of the dial plate, whereby said pointer includes abase assembly, a pointer light source supported by the base assembly, a pointer cap which has a notch at one part thereof and is attached to the base assembly, a pointing portion fixed to the pointer cap to be illuminated by the light emitted from the pointer light source, and a light guide means for guiding a part of the light emitted from the pointer light source through the notch and illuminating a limited area of the dial plate behind the pointing portion.

Therefore, even in night, the part of the dial plate behind the pointing portion is illuminated to make the dial plate pointing by the pointer visible. Moreover, since just the limited area around the pointing portion on the dial plate is illuminated, a novel and interesting visibility can be offered.

According to a sixth aspect of this invention, there is provided the pointer type indicator, wherein said pointing portion comprises a pointer main body made of optically transparent resin, a light introducing portion formed at one end of the pointer main body for introducing light emitted from the pointer light source, a light guiding portion formed at a part of the pointer main body for working as a part of the light guide means and guiding the light introduced from the light introducing portion toward the dial plate, and the emitting layer provided on the pointer main body.

Therefore, the light emitted from the pointer light source can be used for illuminating the pointer and the part of the dial plate through the pointing portion.

According to a seventh aspect of this invention, there is provided the pointer type indicator, wherein said base assembly comprises a stand, a support being so formed as to project from the stand to support the pointer light source, a pointer axis elongated downward to the stand, a slope formed from an upper side of the support with a slope for working as a part of the light guide means and reflecting the light emitted from the light guiding portion toward the dial plate, a shield wall formed at each side of the slope for working as a part of the light guide means and limiting an area of the dial plate to be illuminated by the light guiding portion.

Therefore, the light emitted from the pointer light source is supported, and a part of said light can be used for illuminating the part of the dial plate.

According to an eighth aspect of this invention, there is provided the pointer type indicator, wherein said emitting layer emits light of first color by the light introduced from the light introducing portion, and said light guide means include a color change means mounted on the shield wall for converting the light emitted from the light guiding portion to a light of second color which is different from the first color.

Therefore, the pointer and the limited area of the dial plate behind the pointer can be visible with different colors respectively. Resultingly, a novel and interesting visibility can be offered.

According to a ninth aspect of this invention, there is provided the pointer type indicator, wherein said dial plate is made of metal.

Therefore, even in night, when the part of the dial plate behind the pointer is illuminated, occupants in a vehicle can recognize a metallic feel of the dial plate. Consequently, a pointer type indicator with a high-class feeling can be offered.

According to a tenth aspect of this invention, there is provided the pointer type indicator, wherein a part of said dial plate has a mark of the rising sun or a mark of concentric circles.

Therefore, the metallic feel of the dial plate can be recognized better so as to offer a high-class feeling.

BRIEF DESCRIPTION OF THE DRAWINGS

FIG. 1 is an exploded perspective view showing a pointer type indicator according to one embodiment of this invention;

FIG. 3 is a cross-sectional view showing the pointer in FIG. 1;

DESCRIPTION OF THE PREFERRED EMBODIMENT

Figure 2:
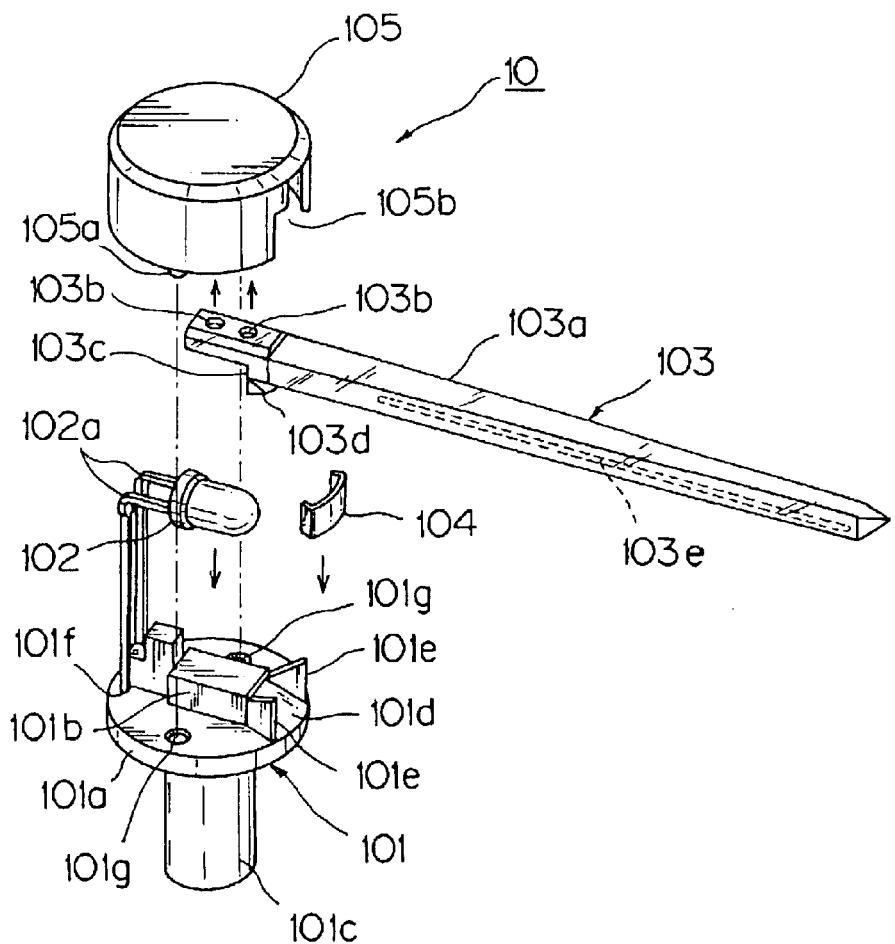
FIG. 2 is an exploded perspective showing a pointer in FIG.

Now, an embodiment according to this invention will be described in detail referring to drawings.

FIG. 1 is an exploded perspective view showing a pointer type indicator according to one embodiment of this invention. As shown in FIG. 1, the pointer type indicator is for a vehicle, and comprises a pointer 10 for pointing measured value, a substrate 20 to which a movement 20a for rotating the pointer 10 is electrically connected, and a metallic dial plate 30 which includes clips 30a being clipped along with a periphery of the indexes corresponding to measured values.

Moreover, the pointer type indicator further comprises a light transmission plate 40 which is disposed at a backside of the dial plate 30 and has projections 40a engaged with the clips 30a, and a light diffusion plate 50 disposed at a backside of the light transmission plate 40. The light transmission plate 40 and the light diffusion plate 50 are resin plates made of an acrylic resin, polycarbonate or the like.

FIG. 2 and FIG. 3 are an exploded perspective view and a cross-sectional view of the pointer 10 in FIG. 1, respectively. The pointer 10 comprises a base assembly 101, a pointer light source 102, a pointing portion 103, a color filter 104 and a pointer cap 105.

The base assembly 101 has a structure so as not to block a light path, whereby the light emitted from the pointer light source 102 illuminates the dial plate 30 through a notch 105b of the pointer cap 105, while transmitting toward the dial plate 30 through the pointer 10.

Namely, the base assembly 101 is one-piece molding made of synthetic resin and comprises: a disk shaped stand 101a; a support 101b being so formed as to project from the stand 101a to support the pointer light source 102; a pointer axis 101c elongated downward to the stand 101a; a slope 101d which reaches a surface of the stand 101a from an upper side of the support 101b; a shield wall 101e formed at each side of the slope 101d; a terminal hole 101f through which a terminal 102a of the pointer light source 102 is inserted; and an attachment hole 101g for engaging with an attachment boss 105a of the pointer cap 105.

The pointer light source 102 is composed of such as LED (light emitting diode) emitting white colored light, and includes the terminal 102a.

The pointing portion 103 comprises: a pointer main body 103a made of synthetic resin; an attachment hole 103b provided on one end of the pointer main body 103a; a light introducing portion 103c provided on the end of the pointer main body 103a for introducing the light emitted from the pointer light source 102; a light guiding portion 103d formed on a lower part of the pointer main body 103a in a slope shape for guiding a part of the light introduced into the light introducing portion 103c toward the dial plate 30; and an emitting layer 103e provided on a bottom surface of the pointer main body 103a by such as stamping of green colored hot stamp or printing.

As described later, the color filter 104 works as a color change means for converting a color of the light emitted from the pointer light source 102 through the light guiding portion 103d of the pointing portion 103 into a color which is different from a color of the emitting layer 103e of the pointing portion 103, such as blue.

The pointer cap 105 includes the attachment boss 105a for engaging with the attachment hole 101g of the stand portion 101a, and the notch 105b for exposing the pointing portion 103, the slope 101d and the slope 101d of the base assembly 101. Namely, the pointer cap 105 is formed so as to support the pointer light source 102 and so as not to leak the light ahead (vehicle occupants' side), while having the notch 105b so as to transmit the light toward the pointer 10.

The pointer 10 is assembled as follows. That is, the terminal 102a of the pointer light source 102 is inserted into the terminal hole 101f of the base assembly 101 so that the support 101b supports the pointer light source 102. Next, the color filter 104 is engaged with the shield wall 101e of the base assembly 101. Next, screws, rivets or the like as fixing means are inserted into the attachment hole 103b of the pointing portion 103 to fix the pointing portion 103 to the pointer cap 105. Next, the attachment boss 105a of the pointer cap 105 being attached to the pointing portion 103 is engaged with the attachment hole 101g of the base assembly 101 to fix the pointing portion 103 to the base assembly 101. Thus, the assembling of the pointer 10 is completed.

Figure 4:
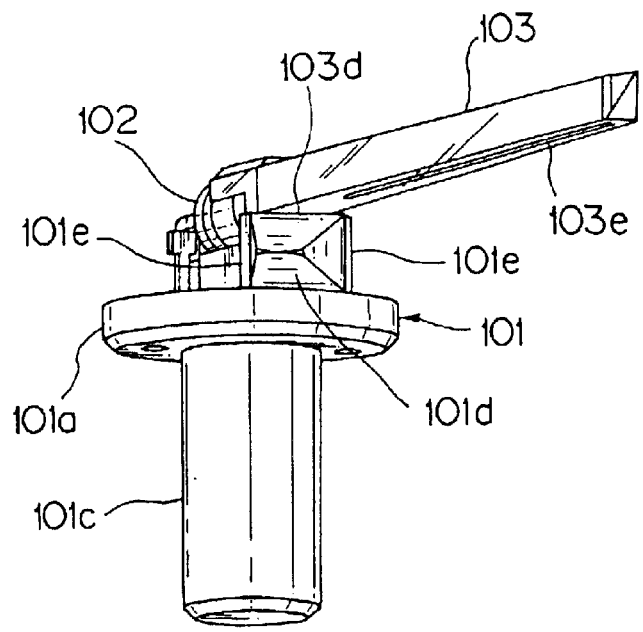
FIG. 4 is a perspective view from an inclined lower angle, explaining substantial parts of the pointer shown in FIG. 1.
Figure 5:
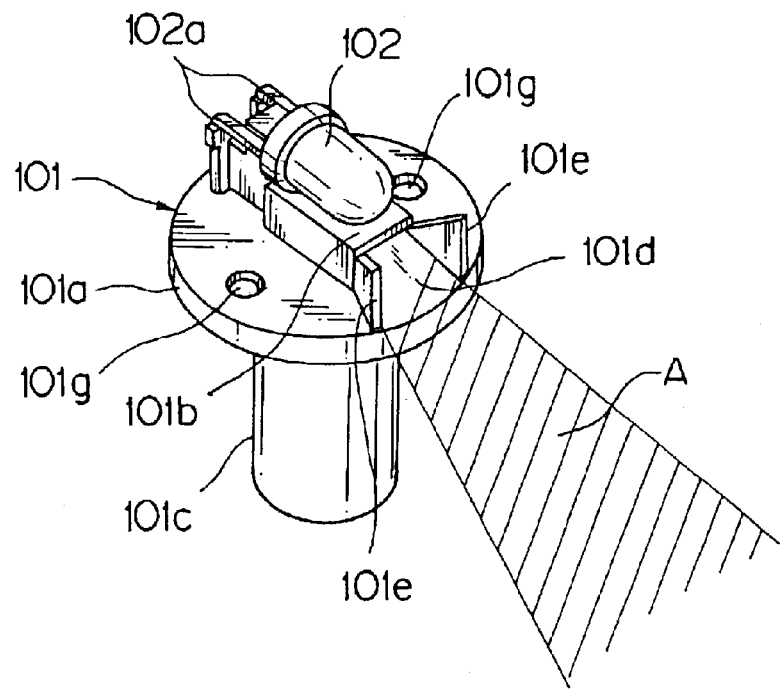
FIG. 5 is a perspective view from an inclined upper angle, explaining another substantial parts of the pointer shown in FIG. 1.

FIGS. 4 and 5 are respective perspective views from inclined lower and inclined upper angles for explaining substantial parts of the pointer. As shown in FIG. 4, the pointing portion 103 is so structured that the light emitted from the pointer light source 102 illuminates the limited area of the dial plate 30 using the light guiding portion 103d of the pointing portion 103, the slope 101d and the shield wall 101e of the base assembly 101 as respective light guiding means. Therefore, the notch 105b of the pointer cap 105 is formed large enough to expose the light guiding portion 103d of the pointing portion 103, the slope 101d and the shield wall 101e of the base assembly 101. Moreover, as shown in FIG. 5, two shield walls 101e have an opening angle to determine an area A of the dial plate 30 to be illuminated with the light emitted from the pointer light source 102.

Figure 6:
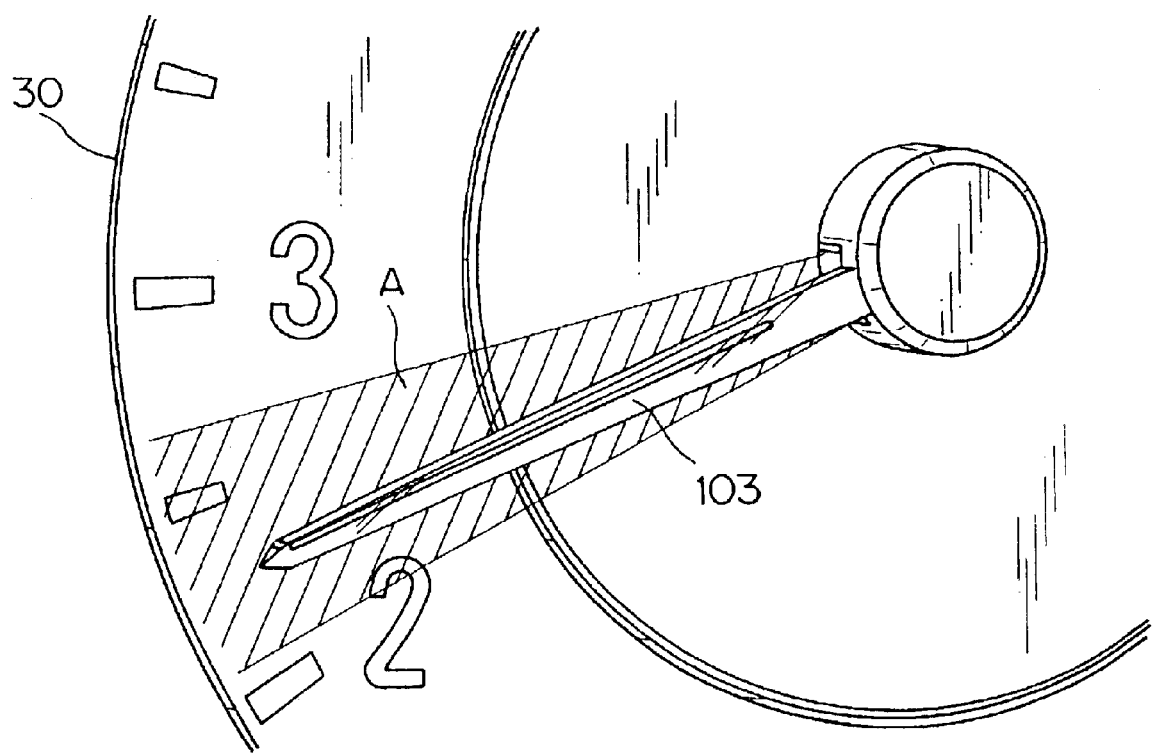
FIG. 6 is an operation view of the pointer type indicator shown in FIG. 1.

Next, referring FIGS. 1 and 6, an operation of the pointer type indicator with above described structure will be explained. When a dial light source (not shown) provided on the back of the light diffusion plate 50 emits light, the light is introduced into the light transmission plate 40 after being diffused by the light diffusion plate 50. The introduced light into the light transmission plate 40 reaches a viewpoint of a vehicle driver through the clips 30a of the dial plate 30. Therefore, the clips 30a of the metal dial plate 30 can be seen emitting from the viewpoint of the driver.

On the other hand, when the pointer light source 102 emits simultaneously with the light emission of the dial light source, the light emitted from the pointer light source 102 is introduced from the light introducing portion 103c into the pointing portion 103. Then, the introduced light advances toward an end of the pointer main body 103a to illuminate the emitting layer 103e. Consequently, the emitting layer 103e emits green.

Additionally, a part of the light emitted from the pointer light source 102 is guided from the light guiding portion 103d and partially reflected by the slope 101d. Then, the light is converted into blue light through the color filter 104. Then, the area A (FIG. 6) of the dial plate limited by the shield walls 101e is illuminated by the light.

As above described, in the dial plate 30, when the clips 30a as indexes for measured values emit, simultaneously the emitting layer 103e of the pointing portion 103 emits green, and the limited area A of the dial plate 30 is illuminated with the blue light. Therefore, even in night, the dial plate 30 can be recognized visually. Moreover, the direction that the pointer main body 103a shows can be recognized easily. Further, since the emission color of the pointing portion 103 (green in this case) differs from the background color (blue in this case), a novel and interesting visibility can be offered.

Figure 7:
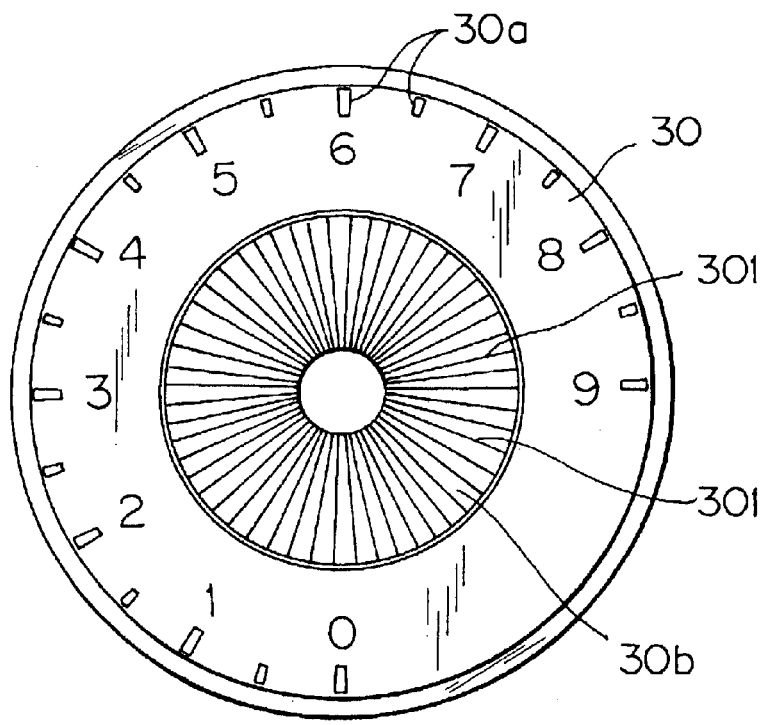
FIG. 7 is a plan view showing a structure of a dial plate in FIG. 1.
Figure 8:
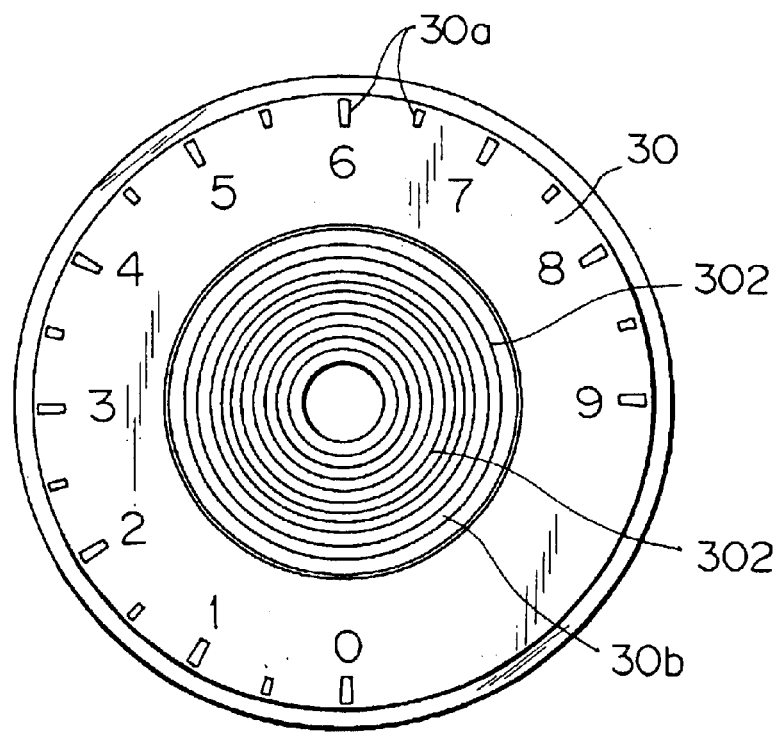
FIG. 8 is another plan view showing the structure of the dial plate in FIG. 1.

Incidentally, such as in FIGS. 7 and 8, a part of a front surface of the metallic dial plate 30, for example a center portion 30b excluding the clips 30a as indexes, can be marked with a plurality of recesses (or grooves) extending radially from the center or, such as a mark of the rising sun 301 or a mark of concentric circles 302, both of which are made of projections. Although these recesses or projections are exaggerated to be shown large in FIGS. 7 and 8, actual width, depth, interval of them are formed very small.

When the center portion 30b of the metallic dial plate 30, which is marked with said mark of the rising sun 301 or said mark of concentric circles 302, is illuminated by the light guided from the light guiding portion 103d, the mark of the rising sun 301 or the mark of concentric circles 302 can be recognized visually to be illuminated with above described blue background, so that the dial plate 30 can be recognized better as metallic. Consequently, a high-class feeling can be given to the pointer type indicator.

Although this invention has been fully described by way of examples with reference to the accompanying drawings, it is to be noted that various changes and modifications can be made in a scope of this invention.

For example, although the dial plate 30 is made of metal in above described embodiment, other material such as synthetic resin may also be used for it.

Moreover, in above described embodiment, the emitting layer 103e of the pointing portion 103 emits green and the light through the color filter 104 is blue. However, other combinations of various colors, such as red, orange and the like can be employed.

Furthermore, in above described embodiment, the pointer type indicator of this invention is for a vehicle. But of course, this invention is applicable to other fields.

What is claimed is:

1. A pointer type indicator comprising:
   a dial plate having indexes corresponding to measured values; and
   a pointer for pointing respective indexes of the dial plate, whereby said pointer includes a base assembly, a pointer light source supported by the base assembly, a pointer cap which has a notch at one part thereof and is attached to the base assembly, a pointing portion fixed to the pointer cap to be illuminated by the light emitted from the pointer light source, and a light guide means for guiding a part of the light emitted from the pointer light source through the notch and illuminating a limited area of the dial plate behind the pointing portion, wherein said pointing portion comprises: a pointer main body made of optically transparent resin; a light introducing portion formed at one end of the pointer main body for introducing light emitted from the pointer light source; a light guiding portion formed at a part of the pointer main body for working as a part of the light guide means and guiding the light introduced from the light introducing portion toward the dial plate; and the emitting layer provided on the pointer main body.

2. The pointer type indicator as claimed in claim 1, wherein said base assembly comprises: a stand; a support being so formed as to project from the stand to support the pointer light source; a pointer axis elongated downward to the stand; a slope formed from an upper side of the support with a slope for working as a part of the light guide means and reflecting the light emitted from the light guiding portion toward the dial plate; a shield wall formed at each side of the slope for working as a part of the light guide means and limiting an area of the dial plate to be illuminated by the light guiding portion.

3. The pointer type indicator as claimed in claim 2, wherein said emitting layer emits light of first color by the light introduced from the light introducing portion, and said light guide means include a color change means mounted on the shield wall for converting the light emitted from the light guiding portion to a light of second color which is different from the first color.

4. The pointer type indicator as claimed in any one of claim 3, wherein said dial plate is made of metal.

5. The pointer type indicator as claimed in any one of claim 3, wherein a part of said dial plate has a mark of the rising sun or a mark of concentric circles.

* * * * *